United States Patent
Neville et al.

(10) Patent No.: US 10,717,491 B1
(45) Date of Patent: Jul. 21, 2020

(54) FOLDING SCOOTER

(71) Applicant: Pro-Motion Mobile Medical Marketing, LLC, The Woodlands, TX (US)

(72) Inventors: Robert E. Neville, The Woodlands, TX (US); Garrett R. Neville, The Woodlands, TX (US)

(*) Notice: Subject to any disclaimer, the term of this patent is extended or adjusted under 35 U.S.C. 154(b) by 0 days.

(21) Appl. No.: 16/585,743

(22) Filed: Sep. 27, 2019

Related U.S. Application Data

(63) Continuation-in-part of application No. 15/920,890, filed on Mar. 14, 2018.

(60) Provisional application No. 62/471,111, filed on Mar. 14, 2017.

(51) Int. Cl.
| | | |
|---|---|---|
| *B62K 15/00* | (2006.01) | |
| *A61H 3/04* | (2006.01) | |
| *B62K 19/46* | (2006.01) | |
| *A61G 5/02* | (2006.01) | |
| *A61H 3/00* | (2006.01) | |

(52) U.S. Cl.
CPC ............ *B62K 15/008* (2013.01); *A61G 5/02* (2013.01); *A61H 3/04* (2013.01); *B62K 19/46* (2013.01); *A61H 2003/005* (2013.01); *A61H 2003/046* (2013.01); *A61H 2201/0161* (2013.01); *A61H 2201/0192* (2013.01)

(58) Field of Classification Search
CPC ............... A61H 3/04; A61H 2003/046; A61H 2003/005; A61H 2201/0192; A61G 5/02; A63C 2201/1253; A63C 2201/161; B62K 3/16; B62K 15/008; B62K 19/46
See application file for complete search history.

(56) References Cited

U.S. PATENT DOCUMENTS

| | | | | |
|---|---|---|---|---|
| 3,419,283 | A * | 12/1968 | Newland | B62K 15/006 280/278 |
| 5,800,317 | A | 9/1998 | Accetta | |
| 6,588,787 | B2 | 7/2003 | Ou | |
| 6,595,536 | B1 * | 7/2003 | Tucker | B62K 15/00 280/278 |
| 6,641,159 | B1 * | 11/2003 | Fan | B62K 15/008 280/261 |
| 7,055,842 | B1 * | 6/2006 | Lin | B62K 15/008 280/278 |
| 7,134,677 | B2 | 11/2006 | Opsvik | |
| 7,314,226 | B2 | 1/2008 | Hsu | |
| 7,780,180 | B2 | 8/2010 | Hoepner et al. | |
| 8,348,288 | B1 | 1/2013 | Laughton, Sr. | |
| 8,608,184 | B2 * | 12/2013 | Janis | A61H 3/04 280/87.021 |
| 2006/0033297 | A1 | 2/2006 | Miller | |

(Continued)

FOREIGN PATENT DOCUMENTS

CN     205469568     8/2016

*Primary Examiner* — Frank B Vanaman
(74) *Attorney, Agent, or Firm* — Bushman Werner, P.C.

(57) ABSTRACT

A scooter comprising a collapsible frame pivotally connected to a head stock assembly. A leg support is mounted on the frame. The head stock assembly comprises a handle bar stem having a wheel assembly attached at its lower end. There is a second wheel assembly attached to the frame assembly. The frame is collapsible to allow the scooter to move from an expanded, use position to a folded or collapsed position for storage.

20 Claims, 7 Drawing Sheets

(56) References Cited

U.S. PATENT DOCUMENTS

| | | | |
|---|---|---|---|
| 2007/0057482 A1* | 3/2007 | Hsu | B62K 15/008 |
| | | | 280/278 |
| 2007/0164528 A1 | 7/2007 | Morath | |
| 2009/0152829 A1* | 6/2009 | Anderson | B62K 3/002 |
| | | | 280/278 |
| 2012/0280467 A1* | 11/2012 | Walther | G06Q 30/0641 |
| | | | 280/263 |
| 2017/0165146 A1* | 6/2017 | Franson | B62K 3/002 |
| 2017/0190377 A1 | 7/2017 | Ku | |
| 2017/0332748 A1* | 11/2017 | Kaplan | A45B 1/04 |

* cited by examiner

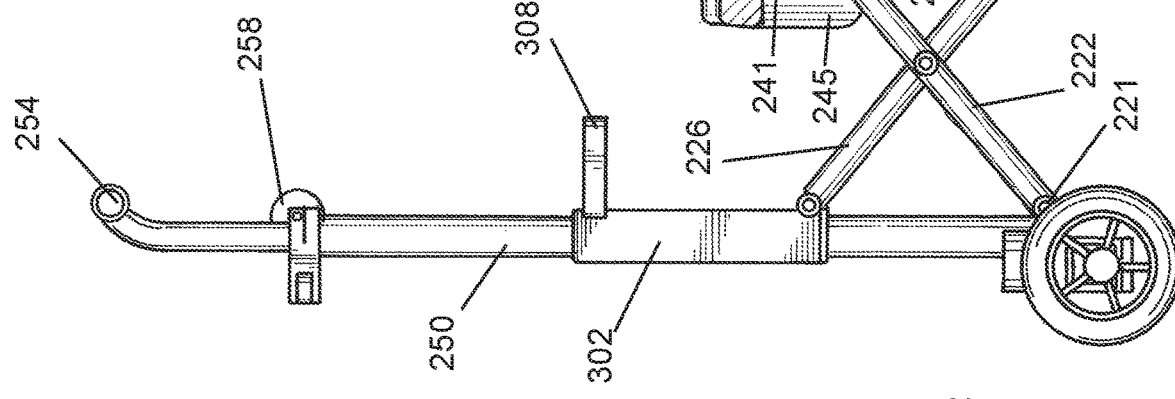
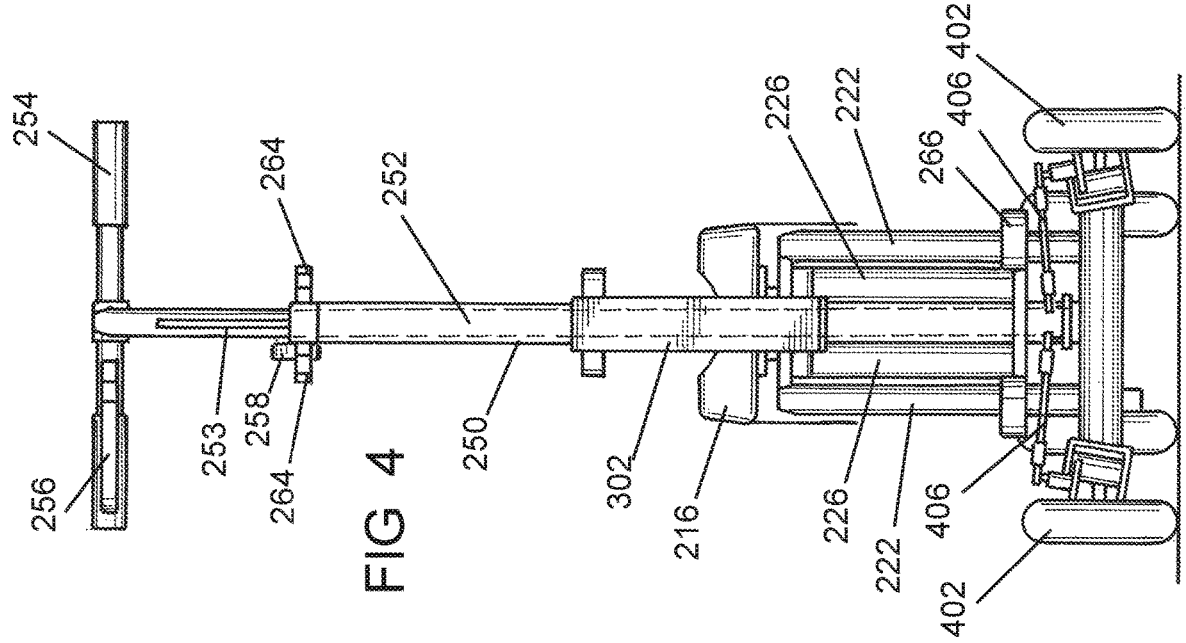

FOLDING SCOOTER

CROSS REFERENCE TO RELATED APPLICATION

This application is a continuation-in-part of U.S. application Ser. No. 15/920,890 filed Mar. 14, 2018, which in turn claims priority to U.S. Application No. 62/471,111 filed on Mar. 14, 2017, the disclosures of which are incorporated herein by reference for all purposes.

FIELD OF THE INVENTION

The present invention relates to manually propelled scooters for use by an individual having an injured leg and, more particularly, to folding knee scooters.

BACKGROUND OF THE INVENTION

Aging of the population has resulted, inter alia, in an increased use of mobile support vehicles to assist people with foot, leg, and knee injuries to move about without the need for crutches, wheel chairs or the like. In particular, one type of mobile support vehicle which is in widespread use is commonly referred to as a knee scooter. Knee scooters are generally used when the user has one disabled leg that has been injured to the extent that walking is either quite painful or precluded. Typically, these knee scooters have a wheeled frame on which is mounted a padded support or the like such that the user can rest the shin and/or knee of the disabled leg on the padded support while grasping suitable handle bars to affect steering, the ambulatory leg of the user being used to propel the scooter.

SUMMARY OF THE INVENTION

In one aspect, the present invention provides a knee scooter which is collapsible or foldable for storage and/or transport.

In another aspect, the present invention provides a foldable knee scooter which can be selectively moved from a first, folded position into a second, expanded or use position.

In a further aspect, the present invention provides a foldable knee scooter which can be selectively latched or locked in a folded position for storage or transport or in an expanded position for use.

These and further features and advantages of the present invention will become apparent from the following detailed description, wherein reference is made to the figures in the accompanying drawings.

BRIEF DESCRIPTION OF THE DRAWINGS

FIG. 4 is a front elevational view of the scooter of FIG. 3.

FIG. 5 is a side elevational view of the scooter of FIG. 3.

DETAILED DESCRIPTION OF PREFERRED EMBODIMENTS

Figure 1:
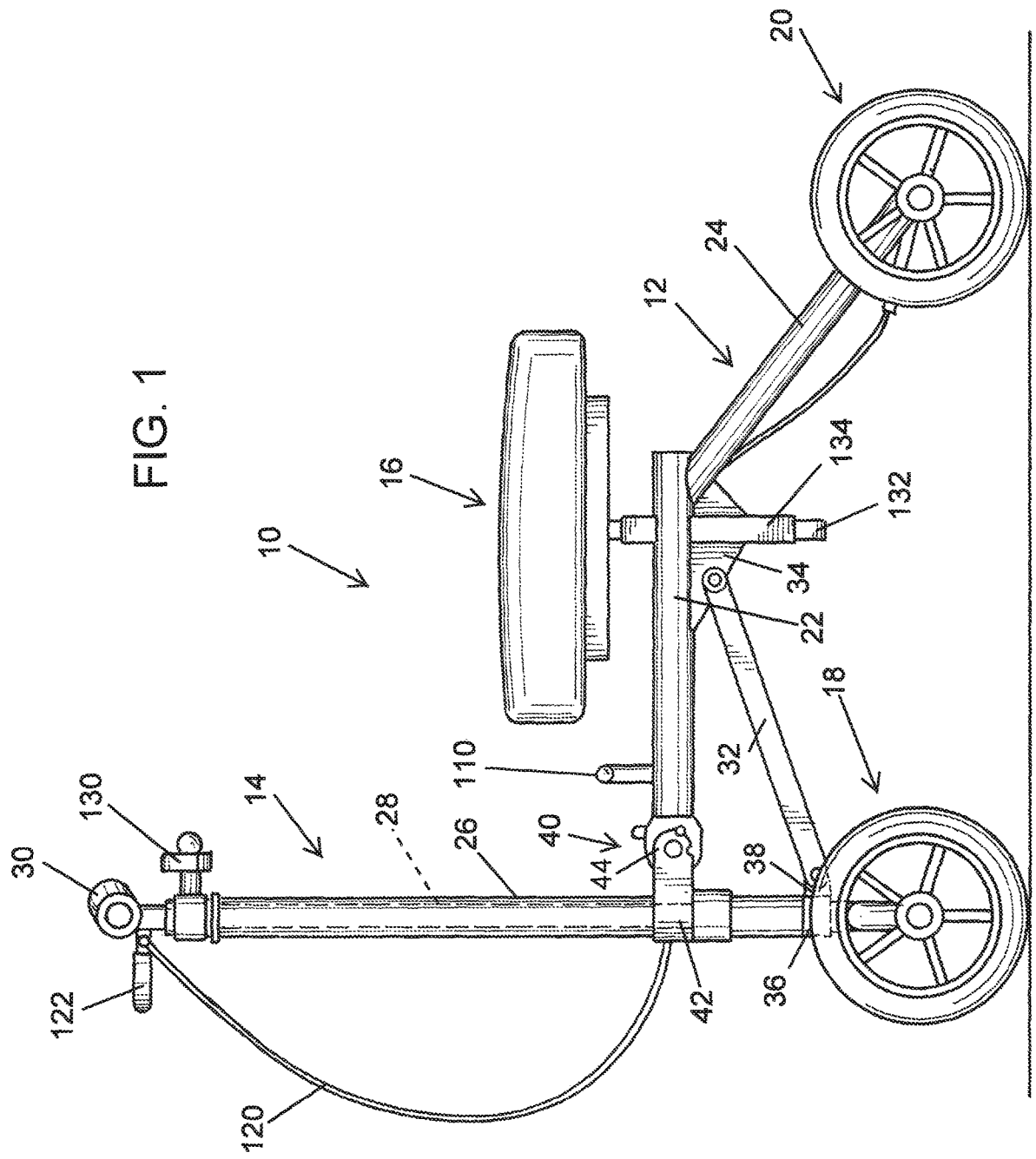
FIG. 1 is a side elevational view of one embodiment of the knee scooter of the present invention.

Referring first to FIG. 1, one embodiment of the scooter of the present invention, shown generally as 10, comprises a frame shown generally as 12, a head stock assembly shown generally as 14, a preferably padded knee or leg support 16 mounted on frame 12, a front wheel assembly shown generally as 18, and a rear wheel assembly shown generally as 20.

Frame 12 comprises a strut 22 and a strut 24 connected to strut 22 at an obtuse angle thereto. Connected to the end of strut 24 distal strut 22 is a rear wheel assembly 20.

Head stock assembly 14 comprises a tubular column 26 in which is rotatably journaled a handle bar stem 28 shown in phantom. A front wheel assembly 18 is connected to handle bar stem 28 adjacent the lower end of column 26. Handle bars or other such hand grips 30 are interconnected to handle bar stem 28 whereby rotation of handle bars 30 results in rotation of handle bar stem 28 and concomitant rotation of front wheel assembly 18. A forked strut 32 having first and second strut members, only one of which is shown, is pivotally connected on one end to column 26 via collar 36 having a clevis portion 38 and on the other end to frame 12 via bracket 34. Strut 32 ensures that column 26 does not rotate relative to the frame 12.

The term "wheel assembly" as used herein can refer to a single wheel or two wheels. Thus, the scooter 10 could have a single front wheel and a single rear wheel, albeit that may be undesirable for a person with a leg injury. More commonly, one of the front wheel assembly 18 or the rear wheel assembly 20 could be of the two-wheeled variety, and the other of the one-wheeled variety. Still more frequently and preferred, wheel assemblies 18 and 20 could both be comprised of two wheels laterally spaced and rotatably mounted on suitable axles.

In the embodiment shown in FIG. 1, scooter 10 is in the expanded or use position. In this position, a person with an injured leg, foot, or knee could place the knee/shin of the injured leg on the support 16, grasp the handle bars 30 and propel scooter 10 with the ambulatory leg. It should be noted that the scooter 10 of the present invention may be used irrespective of which of the user's legs is injured.

Figure 2:
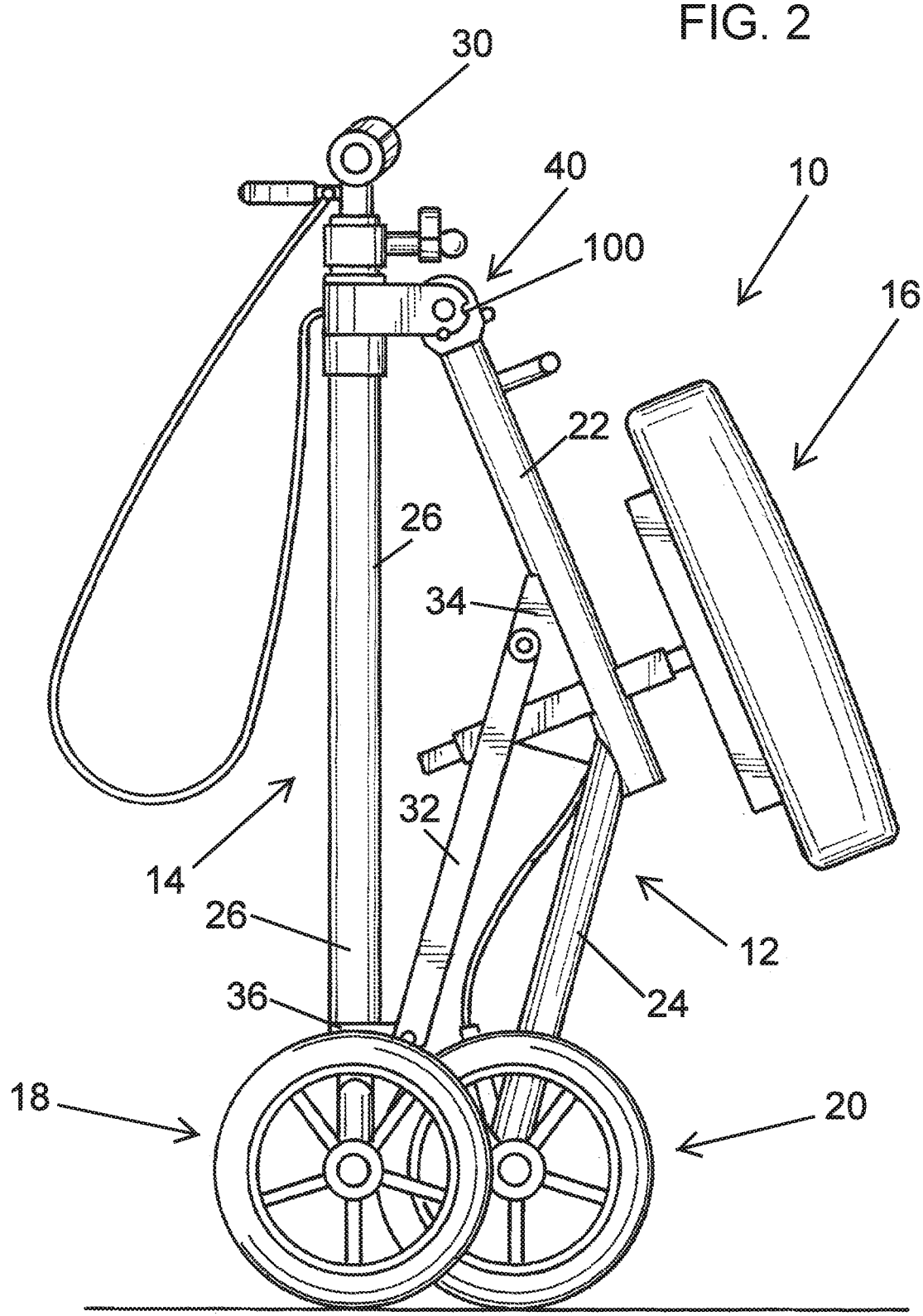
FIG. 2 is a side elevational view of the scooter of FIG. 1 in a folded position for storage or transport.

With reference next to FIG. 2, scooter 10 is shown in the collapsed, or folded position for storage and/or transport, e.g., placing in the trunk of a car. Movement between the expanded position shown in FIG. 1 and the folded position shown in FIG. 2 is effected via a hinge assembly shown generally as 40. As best seen in FIG. 2, hinge assembly 40 comprises a collar portion 42 slidably mounted on column 28 and a selectively releasable latch assembly 44. Hinge assembly 40 is described more fully in U.S. Ser. No. 15/920,890.

Scooter 10 can also be provided with a rear brake assembly controlled by brake cable 120 and brake lever 122. As is apparent, the height of handle bar 30 can be vertically adjusted with an adjustment knob assembly 130 such as for example a knob plunger pin, a pull plunger pin, or a pop pin. Desirably, the locking assembly 130 is of a type that, when engaged, eliminates any play between handle 30 and handle bar stem 28.

As will also be apparent, support or knee rest 16 can be adjusted in height by positioning seat stem 132 at a desired location in sleeve 134. To this end a locking assembly described above with respect to locking assembly 130 can be employed. Also, a simple ball detent arrangement can be employed to releasably, selectively lock stem 132 at various positions in sleeve 134.

Figure 3:
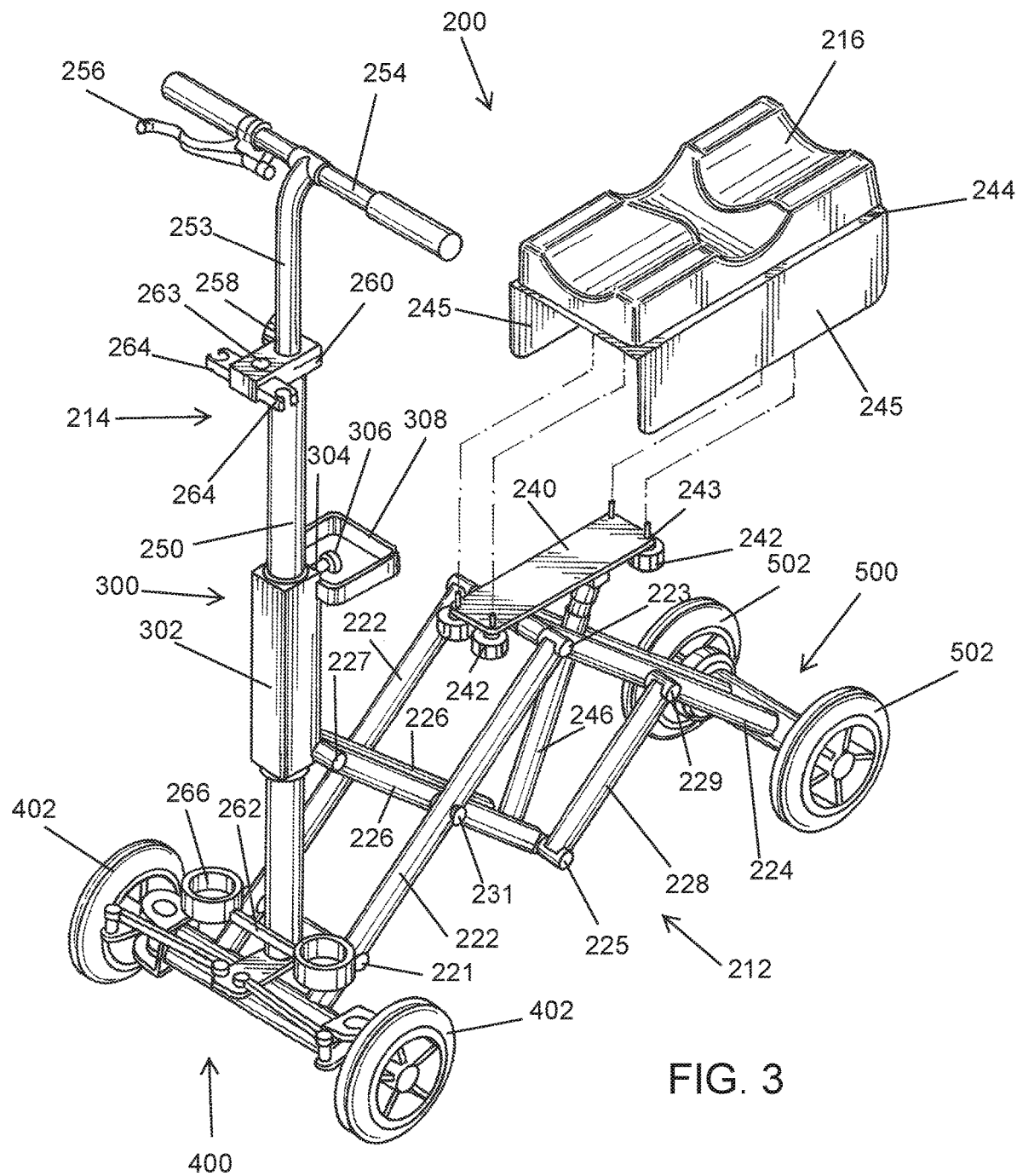
FIG. 3 is a perspective view of another embodiment of the knee scooter of the present invention.

Turning to FIG. 3 there is shown another embodiment of the scooter of the present invention. The scooter, shown generally as 200, comprises a collapsible frame shown generally as 212, a head stock assembly shown generally as 214, a preferably padded knee or leg support 216 mounted on frame 212, a front wheel assembly shown generally as 400, and a rear wheel assembly shown generally as 500.

Frame 212 comprises a pair of parallel main struts 222 connected to another pair of parallel struts 224, by pin joint 223. Connected to the end of struts 222, distal struts 224, is front wheel assembly 400. Struts 222 are connected to front wheel assembly 400 by stubs 230 and pin joint 221. Connected to the end of struts 224 distal struts 222, is rear wheel assembly 500. Thus the main struts of frame 212 extend from the front wheel assembly to the rear wheel assembly. Frame 212 further comprises parallel support struts 226 connected to parallel support struts 228, by pin joint 225. Support struts 228, are connected, distal struts 226, to main struts 224, by a pair of pin joints 229. Support struts 226 are connected, distal struts 228, to collar 302 by pin joint 227. The importance of collar 302 will be explained more fully later. In a preferred embodiment a pair of pin joints 231 can be used to keep struts 222, and 226 in proper position relative to one another, while allowing pivotal movement around pin joint 231.

It will be appreciated by one of ordinary skill in the art that the pin joints 221, 223, 225, 227, and 229 and the exact form of their connection to the various frame components can vary. For example, rather than pairs of pin joints 231 and 229, one may use a single pin joint 231 extending across all struts 222 and 226. The critical aspect is that the struts are able to at least partially pivot around the pin joints. Various bearings, bushings, fasteners and the like will be used throughout scooter 200. Their use is standard and well understood by those of skill in the art and will thus not be specifically set forth here.

Leg support 216 is connected to frame 212 by plate 240. A series of screws 242 extend through holes 243 in plate 240 into registering holes (not shown) in leg support 216. Plate 240 is attached by bracket 241 to pin joint 223 and to a support arm 246 by bracket 248 and pin joint 247. Support arm 246 is in turn pivotally connected to pin joint 225. In a preferred embodiment, support arm 246 is telescoping or otherwise adjustable in length by means well known to those skilled in the art.

In a preferred embodiment, U-shaped member 244 is removably positioned between leg support 216 and plate 240. Like leg support 216, U-shaped member 244 has holes (not shown) for receiving screws 242. U-shaped member 244 has parallel downwardly extending surfaces 245. Adhesive reflectors, stickers, or the like can be placed on surfaces 245 to improve the visibility of the scooter in the dark. Alternatively, customized logos, advertising or the like can be displayed on surfaces 245, allowing a user to personalize the scooter.

Head stock assembly 214 comprises a tubular column 250 in which is rotatably journaled a steering shaft 252. Front wheel assembly 400 is connected to steering shaft 252 adjacent the lower end of column 250. A handle bar or other such hand grip 254 is interconnected to the upper end of steering shaft 253 whereby rotation of handle bar 254 results in rotation steering shaft 252 and concomitant rotation of front wheel assembly 400. Details of front wheel assembly 400 will be discussed later. Brake lever 256 is positioned on handle bars 254. Brake lever 256 operates through a brake cable (not shown) to stop the movement of the wheels of front wheel assembly 400 and/or rear wheel assembly 500 in a manner well known to those skilled in the art. The upper end of steering shaft 252 telescopes into a narrower section 253 such that the height of handle bar 254 can be adjusted. An adjustment knob assembly 258 such as for example a knob plunger pin, a pull plunger pin, or a pop pin engages the narrower upper portion 253 of steering shaft 252 and uses friction to hold the handle bar 254 at the desired height.

In a preferred embodiment, head stock assembly 214 includes upper and lower crutch holders 260 and 262, respectively. Crutch holders 260 and 262 are positioned on column 250. Upper holders 260 comprise a pair of laterally extending grippers 264. Lower holders 262 comprise a pair of cups or recessed pads 266. It is common for a person with an injured or healing leg to use crutches. Even those who use a knee scooter such as shown in the present invention will likely need crutches in certain areas. The crutch holders 260 and 262 are designed to allow a person to removably attach the crutches to the scooter. The upper part of a crutch is secured by gripper 264, while the end of the crutch rests in one of cups 266. Thus the user may bring their crutches with them, lest they find themselves in a position in which the knee scooter must be temporarily left behind/stored. The crutch holders 260 and 262 may also be used to hold walking canes, umbrellas, etc. In a preferred embodiment, upper crutch holder 260 includes an attachment point 263 for attaching additional accessories such as a basket.

As shown in FIGS. 3-5, the scooter 200 is in the expanded or use position. In this position, a person with an injured leg, foot, or knee could place the knee/shin of the injured leg on the support 216, grasp the handle bar 254, and propel scooter 200 with the ambulatory leg. Scooter 200 is designed to function irrespective of which of the user's legs is injured.

Figure 7:
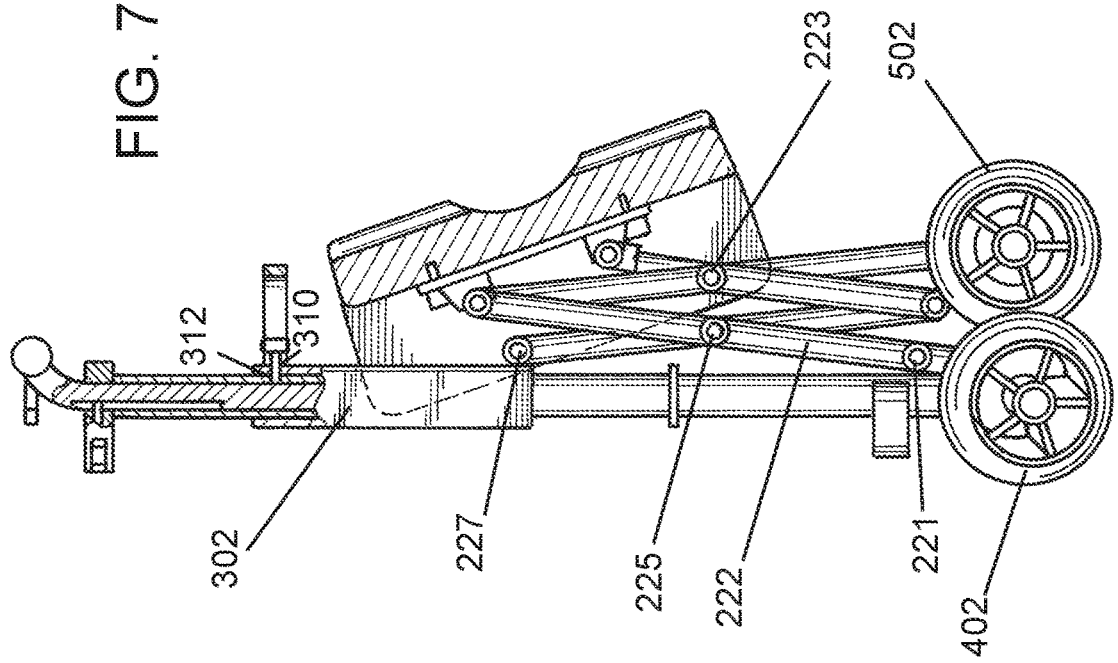
FIG. 7 is a side elevational view of the scooter of FIG. 3 in a folded position for storage or transport.
Figure 6:
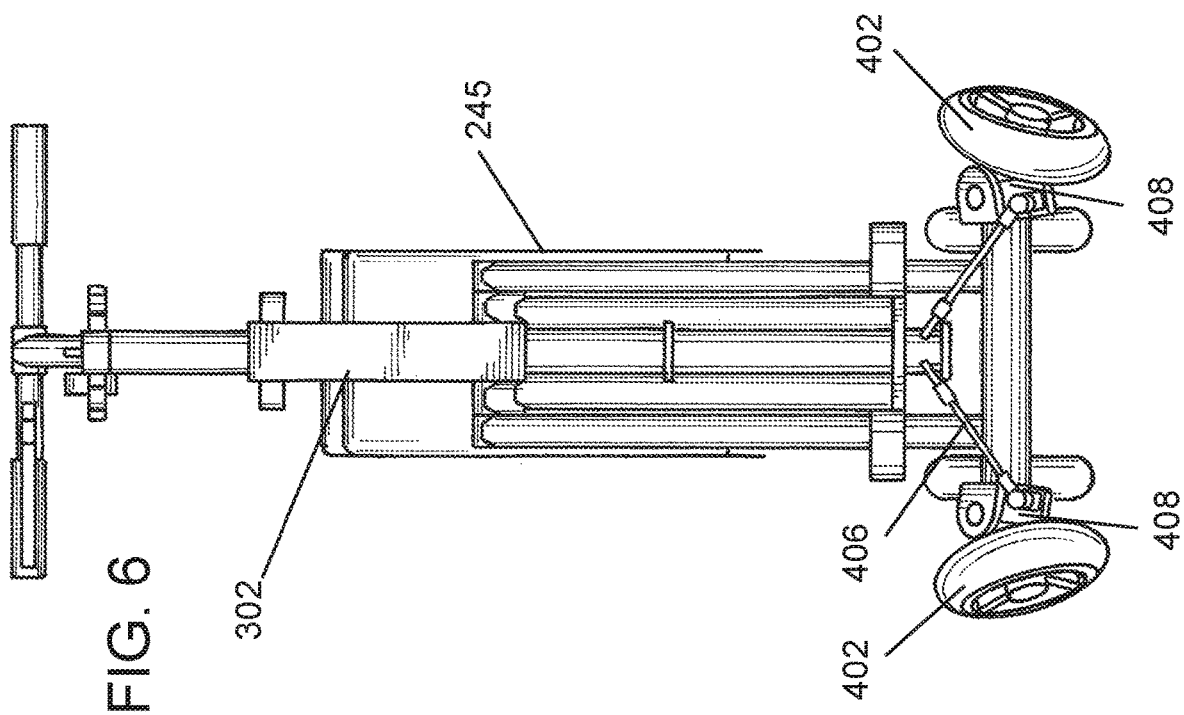
FIG. 6 is a front elevational view of the scooter of FIG. 3 in a folded position for storage or transport.
Figure 8:
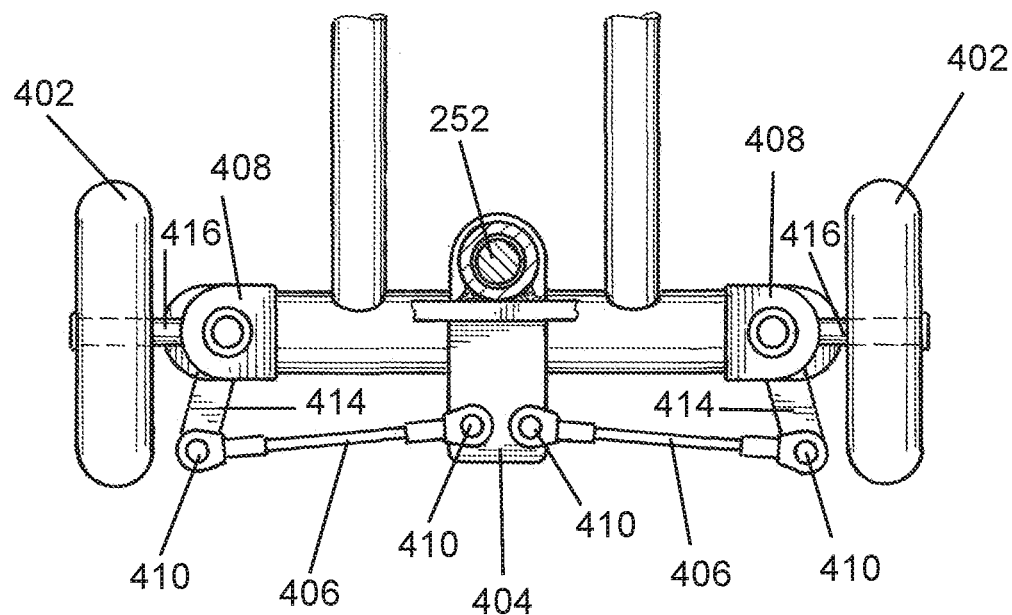
FIG. 8 is a top partial view showing the front wheel assembly of the scooter of FIG. 3.
Figure 9:
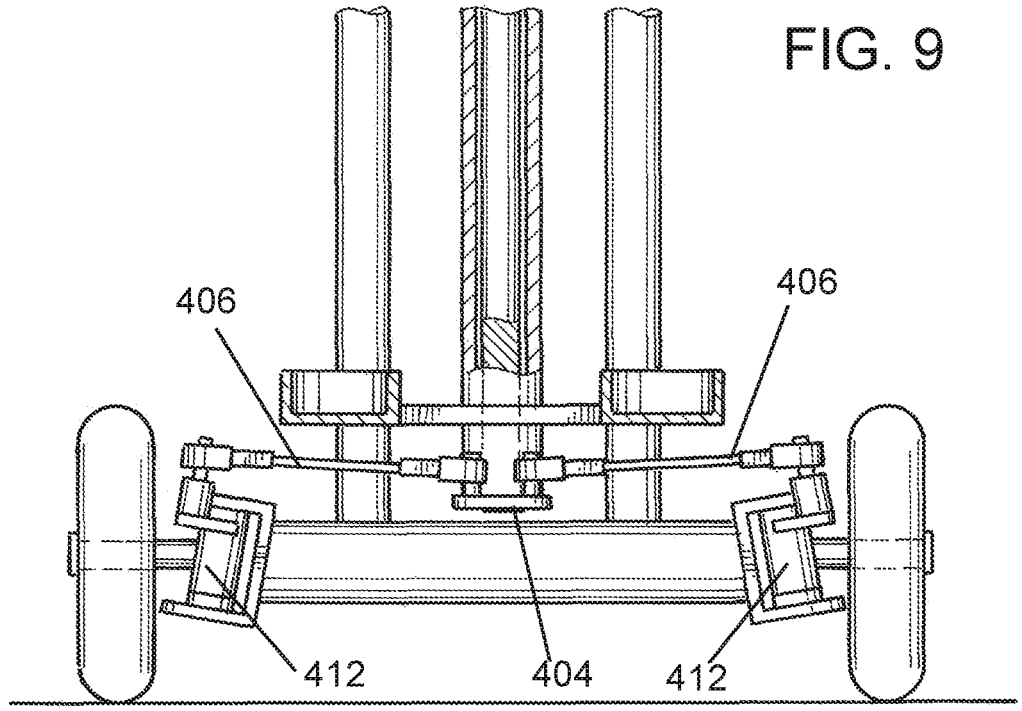
FIG. 9 is a front elevational view, partly in section, showing the front wheel assembly of the scooter of FIG. 3.

FIGS. 6-7 depict scooter 200 in the folded or collapsed position. To switch the scooter from the expanded position to the collapsed position, one must use latch assembly 300. Latch assembly 300 is comprised of collar 302 disposed on column 250, pin 304, knob 306, and handle 308. Pin 304 extends through a hole 310 in collar 302 and engages column 250. In one embodiment pin 304 simply engages the surface of column 250 and uses friction to hold collar 302 in position. In a preferred embodiment, column 250 has one or more holes 312 for receiving pin 304 and thereby preventing movement of collar 302.

When the scooter is in the expanded position, collar 302 is in its lowest position on column 250. Pin 304 extends through hole 310 in collar 302 and extends through a registering hole 312 in column 250. To collapse scooter 200, the user can grip handle 308 and using two fingers pull knob 306 away from column 250. This will pull pin 304 out of engagement with column 250, e.g., out of hole 312, and allow for movement of collar 302. In a preferred embodiment, pin 304 and knob 306 are of an indexing type in which pin 304 is spring loaded as is well known to those skilled in the art. Thus, pin 304 is normally biased outwardly away from knob 305. When knob 306 is pulled, pin 304 is retracted, allowing for movement of collar 302. When knob 306 is released, the spring operation causes pin 304 to extend once again. In a preferred embodiment, column 250 will have a plurality of holes 312, at least one near the lowest position of collar 302, and one at the uppermost position of collar 302, for receipt of pin 304. This nesting of pin 304 within holes 312 will ensure unintentional vertical movement of collar 302 is prevented.

After pulling knob 306, the user then raises collar 302 up along column 250. This movement will pull pin joint 227 up as well as the ends of struts 226. The struts of frame 212 will be pulled in toward one another, and the rear wheel assembly 500 will be pulled toward front wheel assembly 400. When the collar 302 is at the top of column 250, the user can release knob 306 which will then cause pin 304 to extend and reengage column 250. When collar 302 is properly aligned with upper hole 312 in column 250, pin 304 will extend into hole 312. To return scooter 200 to the expanded position, the user again pulls knob 306 to retract pin 304 from upper hole 312, pushes collar 302 downward to its lowermost position and releases knob 306.

In another embodiment, collar 250 has a series of holes 312 along its length. In addition to providing a means for locking scooter 200 in the fully expanded or fully collapsed positions, these additional holes 312 will allow for adjustment of the height of leg support 216. Turning to FIG. 5, scooter 200 is shown expanded. But, what if leg support 216 is too low for a taller user to comfortably rest their leg on? Collar 302 would be moved upward to the next position on column 250. This would cause seat 216 to tilt with the front end higher than the back. Telescoping support arm 246 would then be extended to bring seat 216 to a level position. Thus, the height of seat 216 can be adjusted to accommodate different users. In this regard, the "extended" position for a particular user may not in fact be the most extended position possible by scooter 200, but would simply be the extended position at which the user is still comfortable. Latching system 300 and telescoping support arm 246 thus provide the flexibility for the scooter to be used by people of varying height.

Scooter 200 is designed such that, when it is fully collapsed, the footprint is as small as possible. This allows for easier transport and storage. In this regard, seat 216 is tilted and remains below the height of handlebars 254. As can best be seen in FIG. 4, the rear wheels 502 are closer to one another than are the front wheels 402 to one another. Thus, when collapsed, rear wheels 502 can partially nest between front wheels 402. When collapsed, handle 308 can be used to pull scooter 200 around on rear wheels 502.

Turning to FIGS. 8-11 there is shown front wheel assembly 400 and, in particular, the unique steering system of scooter 200. The steering system of scooter 200 employs the functions of Ackermann steering, caster, and camber. Ackermann steering prevents tires from slipping on turns by using a system of linkages which allow the inside tire to turn at a greater angle than the outside tire. Caster is the slope of the steering axis. The steering axis found by drawing a line drawn through the upper and lower joints of the steering knuckle. Positive caster is when the bottom of the steering axis line is in front of the tire's contact patch. Positive caster ensures good stability, helps maintain straight-ahead direction and promotes self-centering of the steering system. Camber is the inward or outward tilt of the front tires as viewed from the front. Camber is used to distribute load across the entire tread. These three aspects provide superior steering capability as well as stability in scooter 200.

Steering shaft 252 is connected by center link 404 to a plurality of tie rods 406. Each tie rod 406 is in turn connected to a steering knuckle 408 of the type well known to those skilled in the art. Each steering knuckle 408 comprises a center pin or spindle 412. A first arm 414 extends from pin 412 and connects to tie rod 406. A second arm 416 extends from pin 412 and connects to wheel 402. Each end of each tie rod 406 comprises a ball joint connection 410, thus allowing the tie rods to turn and tilt relative to center link 404 and steering knuckles 408. Rotation of steering shaft 252 causes rotation of center link 404. The movement of center link 404 causes tie rods 406 to move, thus causing rotation of pin 412 in steering knuckle 408 and concomitant rotation of wheel 402. The steering system may include additional bearings, bushings, or fastenings which will not be described herein but which are common to such systems and will be readily understood by those skilled in the art.

Figure 10:
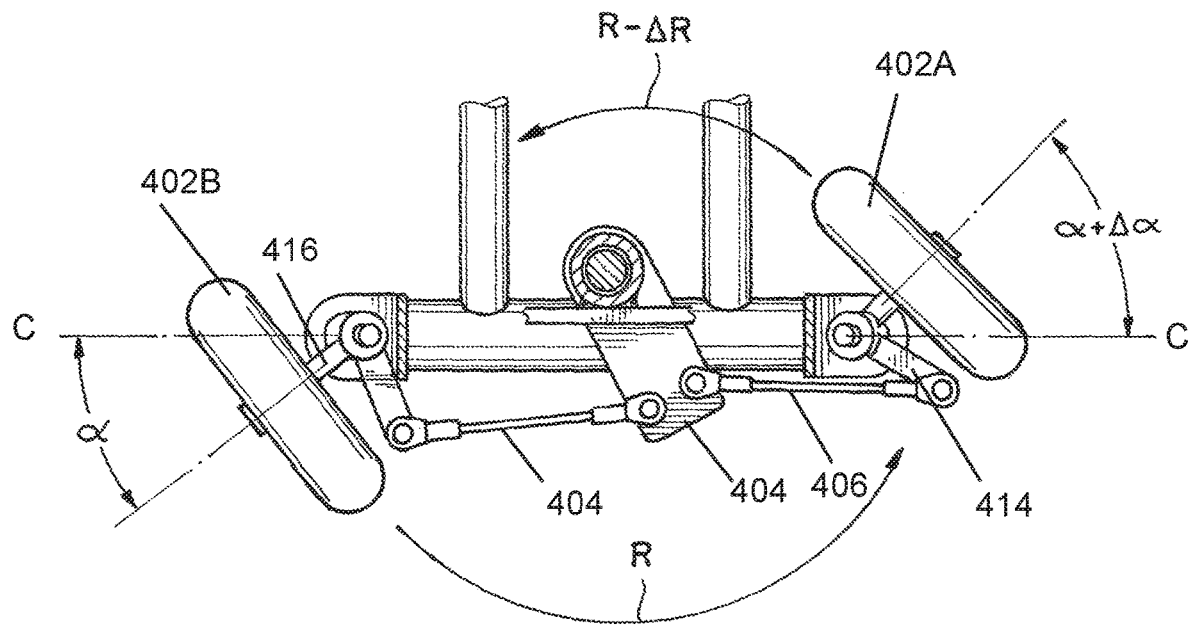
FIG. 10 is a view similar to FIG. 8, showing the angles achieved when turning the front wheel assembly of the scooter of FIG. 3.
Figure 11:
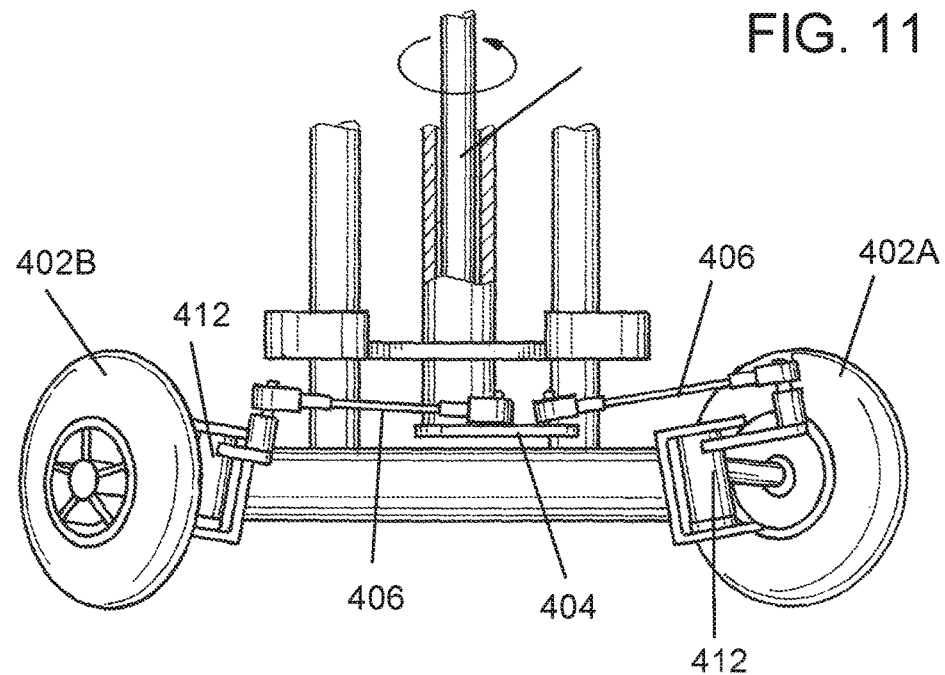
FIG. 11 is a view similar to FIG. 9 showing the angles achieved when turning the front wheel assembly of the scooter of FIG. 3.

Turning to FIGS. 10 and 11, there is shown an example of front wheel assembly when the steering shaft 252 has been turned toward the left by a person using scooter 200. In general, both front wheels are simply be identified as 402. For purposes of discussion of FIGS. 10 and 11, front wheels 402 will be differentiated as inside wheel 402A and outside wheel 402B. It will be understood, that if the scooter were to be turned the opposite direction, the inside wheel and outside wheel would naturally be the opposite wheels as those described in FIGS. 10 and 11. As seen in FIG. 10, inside wheel 402A has turned at a greater angle than that of outside wheel 402B. Outside wheel 402B has turned at an angle of $\alpha$ relative to centerline C. Inside wheel 402A has turned at an angle of $\alpha+\Delta\alpha$. Outside wheel 402B has a larger turning radius, R, compared to that of wheel 402A, R−$\Delta$R. The combination of Ackermann steering, caster, and camber, of the front wheel assembly 400 of scooter 200 improves the ability of scooter 200 to make sharp turns. A person with an injured leg, trying to turn the scooter would not want to find themselves unable to make a turn and thus have to quite literally hop the scooter around the corner. Scooter 200 is able to make tight turns and the self-centering caster of the system allows for smooth transition from turns to straight-aways.

Rear wheels 502 of scooter 200 remain straight. Thus, rear wheel assembly 500 is comprised of rear wheels 502 connected to an axle in a manner well understood by those skilled in the art.

In a preferred embodiment, when collapsed, the lock front wheels 402 tilt and lock such that scooter 200 cannot be moved forward. Pin joint 221 is connected to column 250 by welding or the like. As best seen in FIGS. 5 and 7, when collapsing scooter 200, the movement of frame 212, particularly struts 222, pulls pin joint 221 upward a bit. This accordingly pulls column 250 and center link 404 upward as well. As shown in FIG. 6, center link 404 is up and thus tie rods 406 are tilted at an angle such that wheels 402 tilt into a toe-in position. In this position, wheels 402 cannot roll forward. This prevents the unintentional rolling away of scooter 200 when it is not in use. When in the collapsed position, to roll scooter 200 around, one simply pulls on handle 308 to tilt scooter 200 onto the rear wheels 502 and pulls scooter 200 around on rear wheels 502.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A scooter comprising:
   a foldable frame;
   a leg support connected to said frame;
   a rear wheel assembly connected to said frame;
   a head stock assembly comprising:
      a tubular column having an upper end and a lower end;
      a steering shaft having a first end and a second end, said steering shaft being rotatably journaled in said tubular column;
      a handle bar connected to said first end of said steering shaft;
      a front wheel assembly connected to said second end of said steering shaft;
   a collar slidably mounted on said tubular column and connected to said frame;
   a latching assembly connected to said collar and being selectively operable to lock said scooter in a first position wherein said frame is in a first unfolded position and said collar is in a first lower position on said tubular column, and a second position wherein said frame is in a second folded position and said collar is in a second upper position on said tubular column; and
   said frame comprising a first strut assembly connected to said front wheel assembly, a second strut assembly connected to said rear wheel assembly, said first and second strut assemblies being pivotally connected to one another by a first pin joint, a third strut assembly connected to said collar, a fourth strut assembly connected to said second strut assembly, said third and fourth strut assemblies being pivotally connected to one another by a second pin joint.

2. The scooter of claim 1, wherein said first strut assembly comprises a first set of parallel struts, said second strut assembly comprises a second set of parallel struts, said third strut assembly comprises a third set of parallel struts, and said fourth strut assembly comprises a fourth set of parallel struts.

3. The scooter of claim 1, wherein said latching assembly comprises a spring biased pin extending through said collar, there being at least one hole in said tubular column for receiving said pin, said pin being releasably biased to extend into said at least one hole and thereby preventing said collar from sliding along said column.

4. The scooter of claim 1, further comprising a crutch holder assembly.

5. The scooter of claim 4, wherein said crutch holder assembly comprises an upper pair of grippers connected to said tubular column, and a lower pair of cups connected to said tubular column.

6. The scooter of claim 1, wherein said front wheel assembly comprises:
   a center linkage connected to said steering shaft;
   a first tie rod connected one end to said center linkage and at another end to a first steering knuckle, said first steering knuckle connected to a first wheel;
   a second tie rod connected at one end to said center linkage and at another end to a second steering knuckle, said second steering knuckle connected to a second wheel;
   whereby turning of said steering shaft causes turning of said center linkage, movement of said first and second tie rods, turning of said first and second steering knuckles and turning of said first and second wheels.

7. The scooter of claim 6, wherein said first and second wheels are tilted when said scooter is in said second folded position.

8. A scooter comprising:
   a foldable frame;
   a leg support connected to said frame;
   a rear wheel assembly connected to said frame;
   a head stock assembly comprising:
      a tubular column having an upper end and a lower end;
      a steering shaft having a first end and a second end, said steering shaft being rotatably journaled in said tubular column;
      a handle bar connected to said first end of said steering shaft;
      a front wheel assembly connected to said second end of said steering shaft;
   a collar slidably mounted on said tubular column and connected to said frame;
   a latching assembly connected to said collar and being selectively operable to lock said scooter in a first position wherein said frame is in a first unfolded position and said collar is in a first lower position on said tubular column, and a second position wherein said frame is in a second folded position and said collar is in a second upper position on said tubular column;
   wherein said front wheel assembly comprises:
      a center linkage connected to said steering shaft;
      a first tie rod connected one end to said center linkage and at another end to a first steering knuckle, said first steering knuckle connected to a first wheel;
      a second tie rod connected at one end to said center linkage and at another end to a second steering knuckle, said second steering knuckle connected to a second wheel;
      whereby turning of said steering shaft causes turning of said center linkage, movement of said first and second tie rods, turning of said first and second steering knuckles and turning of said first and second wheels.

9. The scooter of claim 8, wherein said latching assembly comprises a spring biased pin extending through said collar, there being at least one hole in said tubular column for receiving said pin, said pin being releasably biased to extend into said at least one hole and thereby preventing said collar from sliding along said column.

10. The scooter of claim 8, further comprising a crutch holder assembly.

11. The scooter of claim 10, wherein said crutch holder assembly comprises an upper pair of grippers connected to said tubular column, and a lower pair of cups connected to said tubular column.

12. The scooter of claim 8, wherein said frame comprises a first strut assembly connected to said front wheel assembly, a second strut assembly connected to said rear wheel assembly, said first and second strut assemblies being pivotally connected to one another by a first pin joint, a third strut assembly connected to said collar, a fourth strut assembly connected to said second strut assembly, said third and fourth strut assemblies being pivotally connected to one another by a second pin joint.

13. The scooter of claim 12, wherein said first strut assembly comprises a first set of parallel struts, said second strut assembly comprises a second set of parallel struts, said third strut assembly comprises a third set of parallel struts, and said fourth strut assembly comprises a fourth set of parallel struts.

14. The scooter of claim 8, wherein said first and second wheels are tilted when said scooter is in said second folded position.

15. A scooter comprising:
a foldable frame;
a leg support connected to said frame;
a rear wheel assembly connected to said frame;
a head stock assembly comprising:
   a tubular column having an upper end and a lower end;
   a steering shaft having a first end and a second end, said steering shaft being rotatably journaled in said tubular column;
   a handle bar connected to said first end of said steering shaft;
   a front wheel assembly connected to said second end of said steering shaft;
a collar slidably mounted on said tubular column and connected to said frame;
a latching assembly connected to said collar and being selectively operable to lock said scooter in a first position wherein said frame is in a first unfolded position and said collar is in a first lower position on said tubular column, and a second position wherein said frame is in a second folded position and said collar is in a second upper position on said tubular column;
wherein said frame comprises a first strut assembly connected to said front wheel assembly, a second strut assembly connected to said rear wheel assembly, said first and second strut assemblies being pivotally connected to one another by a first pin joint, a third strut assembly connected to said collar, a fourth strut assembly connected to said second strut assembly, said third and fourth strut assemblies being pivotally connected to one another by a second pin joint;
wherein said front wheel assembly comprises:
   a center linkage connected to said steering shaft;
   a first tie rod connected one end to said center linkage and at another end to a first steering knuckle, said first steering knuckle connected to a first wheel;
   a second tie rod connected at one end to said center linkage and at another end to a second steering knuckle, said second steering knuckle connected to a second wheel;
   whereby turning of said steering shaft causes turning of said center linkage, movement of said first and second tie rods, turning of said first and second steering knuckles and turning of said first and second wheels.

16. The scooter of claim 15, wherein said first strut assembly comprises a first set of parallel struts, said second strut assembly comprises a second set of parallel struts, said third strut assembly comprises a third set of parallel struts, and said fourth strut assembly comprises a fourth set of parallel struts.

17. The scooter of claim 15, wherein said latching assembly comprises a spring biased pin extending through said collar, there being at least one hole in said tubular column for receiving said pin, said pin being releasably biased to extend into said at least one hole and thereby preventing said collar from sliding along said column.

18. The scooter of claim 15, wherein said first and second wheels are tilted when said scooter is in said second folded position.

19. The scooter of claim 15, further comprising a crutch holder assembly.

20. The scooter of claim 19, wherein said crutch holder assembly comprises an upper pair of grippers connected to said tubular column, and a lower pair of cups connected to said tubular column.

\* \* \* \* \*